United States Patent [19]
Lau

[11] Patent Number: 5,823,554
[45] Date of Patent: Oct. 20, 1998

[54] FOLDING, PEDAL-DRIVEN VEHICLE WITH UNIVERSAL JOINT TRANSMISSION SYSTEM

[76] Inventor: James C. K. Lau, 19515 Redbeam Ave., Torrance, Calif. 90503

[21] Appl. No.: 572,239

[22] Filed: Dec. 13, 1995

Related U.S. Application Data

[63] Continuation-in-part of Ser. No. 226,898, Apr. 13, 1994, Pat. No. 5,486,015.

[51] Int. Cl.⁶ .................................................. B62M 1/02
[52] U.S. Cl. ........................ 280/261; 280/231; 280/287
[58] Field of Search ................................. 280/212, 214, 280/223, 224, 225, 244, 231, 230, 253, 258, 270, 252, 249, 259, 260, 261, 287; 74/594.1

[56] References Cited

U.S. PATENT DOCUMENTS

| | | |
|---|---|---|
| D. 277,744 | 2/1985 | Traylor . |
| 397,144 | 2/1889 | Sams . |
| 3,588,144 | 6/1971 | Padial . |
| 3,880,449 | 4/1975 | Wada ...................................... 280/261 |
| 3,979,136 | 9/1976 | Lassiere . |
| 3,990,717 | 11/1976 | Best . |
| 4,132,428 | 1/1979 | Lassiere . |
| 4,182,522 | 1/1980 | Ritchie . |
| 4,198,072 | 4/1980 | Hopkins . |
| 4,436,173 | 3/1984 | Takahashi ................................. 280/260 |
| 4,502,705 | 3/1985 | Weaver ................................ 280/242.1 |
| 4,773,662 | 9/1988 | Phillips ................................... 280/230 |
| 4,773,663 | 9/1988 | Sawyer et al. . |
| 4,789,173 | 12/1988 | Lofgren et al. . |
| 4,838,568 | 6/1989 | Arroyo . |
| 5,039,122 | 8/1991 | Deutch et al. ........................... 280/246 |
| 5,158,314 | 10/1992 | Farras Pinos ........................... 280/259 |
| 5,397,145 | 3/1995 | Kobluk .................................... 280/252 |

FOREIGN PATENT DOCUMENTS

| | | |
|---|---|---|
| 2 590 538 | 5/1987 | France . |
| 33 35 285 A | 2/1984 | Germany . |
| 501515 | 11/1954 | Italy . |
| 1382733 | 3/1988 | U.S.S.R. . |
| 1406024 | 6/1988 | U.S.S.R. . |

OTHER PUBLICATIONS

RCN #19/20, 1994, RCN Buyers Guide, Recumbent Cyclist News.

Primary Examiner—Brian L. Johnson
Assistant Examiner—Gary Savitt
Attorney, Agent, or Firm—Armstrong, Westerman, Hattori, McLeland & Naughton

[57] ABSTRACT

A folding, pedal-driven vehicle having a universal joint transmission system is provided. A human-powered ground vehicle having a motive power input assembly that includes foot pedals to drive a front-wheel of the vehicle through a universal joint drive gear system is also provided. Folding, recumbent vehicles for one or two riders are also provided and each includes a transmission system having a pedal-drive power input assembly pivotally connected to a universal joint which in turn is pivotally connected to a drive connection for driving a front wheel of the vehicle.

19 Claims, 9 Drawing Sheets

FOLDING, PEDAL-DRIVEN VEHICLE WITH UNIVERSAL JOINT TRANSMISSION SYSTEM

CROSS-REFERENCE TO RELATED APPLICATIONS

This is a continuation-in-part of U.S. patent application Ser. No. 08/226,898, filed Apr. 13, 1994, which issued as U.S. Pat. No. 5,486,015 on Jan. 23, 1996.

BACKGROUND OF THE INVENTION

1. Field of the Invention

The present invention relates to human powered ground transportation vehicles having two or more wheels, such as bicycles and the like. More particularly, the present invention relates to a bicycle, or similar vehicle, constructed for convenient manual transformation between an erected operating configuration, for transporting one or more passengers, and a compactly folded position, for facilitating toting the vehicle about as well as stowing it away.

2. Description of the Related Art

Today, bicycles enjoy wide recognition and favorable acceptance as a means of transportation. Bicycle design and construction has evolved tremendously over the years, and further evolution will likely continue long into the future.

In the early days of development, both steering and powering functions for the typical bicycle were carried out via the front wheel. A typical steering arrangement included a handlebar, attached atop a steering column, as a means for operator controlled steering of the vehicle. In this regard, the handlebar/steering column arrangement was designed to rotate in concert with the front wheel. Any manual rotation of the handlebar effected an identical angular rotation of the front wheel. For motion, early systems typically supplied driving power, derived from a rider's leg work, directly to the front wheel. In this regard, the drive systems, generally included a pair of rider engagable foot pedals. One pedal was positioned laterally outward of, and alongside, each outer face of the wheel. Connection means were provided to rigidly attach the pedals at opposing ends of the front wheel axle.

Although effective for certain limited purposes, the early direct drive systems were characterized by various disadvantages. For example, the typical human operator was physically incapable of rotating the front wheel assembly, via the foot pedals, at such a rate (revolutions per minute) as required in order to achieve high vehicle speeds (i.e., more than 15 mph). Further, high speed travel could not be achieved even when such a direct drive system was used in combination with a large-diameter front wheel (e.g., five feet). Another disadvantage, which was characteristic of the early direct drive systems, was incurred due to the rigid attachment of the foot pedals at the front wheel axle. Such attachment required that the pedals rotate about the vehicle's steering axis upon rotation of the front wheel. This characteristic made vehicle steering maneuvers highly cumbersome for the operator.

Subsequent design efforts, aimed at permitting an increase in top vehicle speed without requiring the use of a large-diameter front wheel, eventually lead to the introduction of gears into the vehicle drive system arrangement. Achievable bicycle top speeds increased tremendously as a result. The developed gears and the various systems of gears, additionally, permitted the foot pedals to be fixed with respect to the vehicle frame instead of at the front wheel axle. Accordingly, the problems due to pedal rotation during steering could be avoided. The great successes enjoyed through the use of gears in the various bicycle operational systems prompted still further development efforts. Today, developers continue such efforts to create new and/or improved gears and gear arrangements capable of satisfying a variety of targeted needs and goals.

Numerous and varied additional changes and improvements in bicycle design have been observed over the past century. The typical bicycle of today generally includes a metal frame mounted on two wire-spoked wheels with one behind the other, a seat, handlebars for steering, and a pair of pedals by which it is driven. The majority of present day bicycles are constructed so that steering is accomplished via the forwardly positioned wheel and drive (power) for the vehicle is provided via the rearwardly positioned wheel. The overall length of such arrangements tend to exceed five feet. The vehicle weight is sometimes minimized by utilizing light weight materials, such as aluminum or fiber reinforced resins. Bicycle constructions which employ such materials can achieve vehicle weights as low as 10 pounds.

In spite of the widespread acceptance of bicycles as a means of transportation highly useful for many purposes, riders nevertheless often encounter problems upon reaching a destination point. For example, adequate facilities may not exist at a particular destination for storing the bicycle. Unfortunately, when a bicycle is temporarily parked and left unattended, it often becomes a target for theft and/or vandalism. Another problem can be encountered if the bicycle is used during, or in making, only a limited portion of a trip. In such a situation, the use and/or presence of the bicycle, especially a large and/or heavy one, will not always be desirable. For example, it may become necessary for a rider to carry the bicycle onto a different transportation vehicle for a time (e.g., a bus, van, train, plane, etc.). Such a situation could arise when the only reasonable means available to get to a particular desired location is by way of a common public transportation vehicle, but the rider contemplates a future need to use the bicycle after arriving at the location. It is not only inconvenient to hand carry presently known ordinary bicycles, but also those constructed of very light weight materials. This is due to the fact that many problems arise primarily as a result of vehicle length. Typical vehicle lengths are often equal to, or greater than, average human height. Thus, problems caused merely by the spatial outlay of a vehicle can deter or prohibit a rider from carrying it about and/or stowing it safely away during periods of non-use (e.g., while at the workplace).

Development efforts, focused at reducing the vehicle carrying configuration length and width, have given rise to bicycle designs incorporating various folding schemes. Although the known folding bicycle designs exhibit a number of differences from the typical features of ordinary bicycles, they have all continued to utilize the typical basic steering and power drive arrangement employed with ordinary bicycles. So far, the reductions in carrying configuration size (volume) achieved by the known folding bicycles have not proven sufficient to promote their general recognition and acceptance.

In order to operate a typical bicycle, a force (power) must be imparted by the rider's legs towards the vehicle pedals. Generally, this operating force extends in a substantially vertical direction. Accordingly, the rider usually assumes a riding position which facilitates the application of such force. The usual position assumed by the rider tends to make the overall vehicle/rider height greater than four feet. As a consequence, a large frontal view cross sectional area of the rider's body is exposed which acts as a source of drag.

There is a known bicycle design-type which reduces the frontal cross sectional area exposed by a rider, as compared to that encountered with the more typical bicycle constructions. Such vehicles are known as recumbent bicycles. Recumbent bicycles are designed so that the rider assumes a lay-back position during vehicle operation. Recumbent bicycles have been the predominant design-type used by riders in setting the currently held short distance speed records. Despite their successes, recumbent bicycles are recognized to present certain problems of their own. Recumbent bicycles equipped with typical front wheel steering and back wheel drive require the use of long drive chains which are positioned under the rider. Unfortunately, such drive chains are a potential source of drag since they tend to add to the vehicle height and, thus, to the frontal view cross sectional area.

As can be readily ascertained from the foregoing, various improvements in bicycle design and construction are desirable.

It is a general object of the present invention to provide a human powered ground transportation vehicle having two or more wheels.

It is a particular object of the present invention to provide a bicycle, or similar vehicle, constructed for convenient manual transformation between an erected operating configuration and a compactly folded position.

It is a further object of the present invention to provide a compactly folded bicycle, or similar vehicle, which can be readily carried by hand and/or stowed away, as desired.

It is a related object of the present invention to provide a compactly folded bicycle, or similar vehicle, which occupies a reduced hand-carrying configuration volume compared to that occupied by the known constructions in the art.

It is also a related object of the present invention to provide a compactly folded bicycle, or similar vehicle, which demands less space for storage than that required for storing any of the known constructions in the art.

An additional object of the present invention is to provide a human powered ground transportation vehicle which has a relatively low frontal view cross sectional area in order to minimize drag.

It is a related object of the present invention to provide a low drag, human powered ground transportation vehicle, having one forwardly positioned wheel and at least one rearwardly position wheel, wherein the construction is uniquely adapted to utilize the forwardly positioned wheel both for effecting vehicle steering maneuvers as well as for powering the vehicle.

It is also a related object of the present invention to provide a front wheel steering, front wheel drive, low-drag, human powered ground transportation vehicle equipped with a uniquely designed gear arrangement for the vehicle drive system; wherein the gear system design permits both highly effective vehicle drive system performance and, at the same time, good overall vehicle performance substantially unaffected by the structural presence and/or the physical operations of the gear system.

It is yet a further object of the present invention to provide a foldable bicycle, or similar vehicle, which is relatively simple and low in cost, yet is reliable and efficient as a means for transportation.

SUMMARY OF THE INVENTION

The present invention is adapted to be embodied in a human powered ground vehicle. One feature of the invention comprises a vehicle frame having forward and rearward ends. A steering column is also included which extends across the vehicle frame. Additionally, foot pedals are provided, coupled to the frame, for revolving motion about an axis which traverses the vehicle frame and is located laterally forward of the steering column.

Also, various features of the present invention are adapted to be embodied in both two-wheeled and three-wheeled vehicle constructions. The vehicles are provided with front wheel steering and front wheel drive. The vehicles are advantageously foldable between a deployed operating configuration and a compactly folded configuration.

Additional features and advantages of the present invention will become clear from the following description.

BRIEF DESCRIPTION OF THE DRAWINGS

The structure and manner of operation of the invention, together with the further objects and advantages thereof, may best be understood by reference to the following description taken in conjunction with the accompanying drawings, in which identical reference numerals identify similar elements, and in which:

FIGS. 6(A)–(C) are various views of a variable gear ratio device according to the teachings of the present invention;

FIGS. 7(A)–(D) are various views of gears used to transmit human power from a gear fixed with respect to the vehicle frame to a gear fixed with respect to the front steering column according to the teachings of the present invention;

DETAILED DESCRIPTION OF THE PREFERRED EMBODIMENT

The following discussion of the preferred embodiments of the present invention is merely exemplary in nature. Accordingly, this discussion is in no way intended to limit the scope of the invention, application of the invention, or the uses of the invention.

Figure 1:
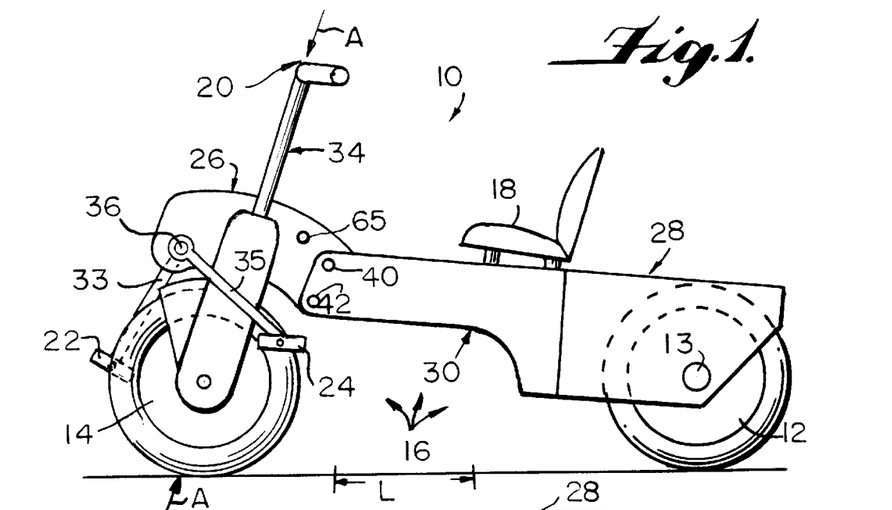
FIG. 1 is a side view of a two-wheeled human powered ground vehicle in a fully erected operating configuration according to the teachings of a preferred embodiment of the present invention.

Referring initially to FIG. 1, one preferred embodiment of the human powered ground transportation vehicle 10 is shown in side elevational view. The vehicle 10 is provided with two wheels with one wheel 12 positioned behind the other wheel 14. Vehicles of this general type are popularly known (and herein referred to) as 'bicycles'.

The bicycle 10 of FIG. 1 is depicted in its fully erected operating configuration. The reference letter "L" is shown as designating a distance of approximately one foot along the vehicle's longitudinal axis. Such length is merely set forth for illustrative purposes and is not intended to be limiting. It should be noted that the present invention contemplates a variety of sizes, shapes, and various dimensions, for a vehicle constructed in accordance with the teachings set forth herein.

Bicycle 10, as illustrated, includes a number of basic components, such as: a frame 16 spanning the distance between the wheels 12, 14; a seat 18 to accommodate a rider in a straddle position; handlebars 20 for steering; and a pair of pedals 22 and 24 (right-side and left-side, respectively) by which it is driven. Briefly, regarding vehicle steering, the present invention employs an arrangement which allows manual turning of the front wheel 14, as desired, via the handlebars 20 and steering column 34 arrangement. With regard to vehicle drive, in accordance with the teachings of this invention, foot power applied to the pedals 22, 24 is transmitted to the front wheel 14 via a gear system and chain arrangement.

Vehicle 10 differs significantly from ordinary bicycles in design, structural arrangement, and operation. For example, as noted earlier, the majority of present day bicycles are constructed so that steering is accomplished via a forwardly positioned wheel and drive (power) for the vehicle is provided via a rearwardly positioned wheel. Bicycle 10 of the present invention, on the other hand, is constructed so that both steering and drive are effected via the front wheel 14.

Another difference in the arrangement of bicycle 10, from that of ordinary bicycles, involves the spatial relationship between the location of the pedals 22, 24 with respect to the seat 18. As ascertainable from FIG. 1, a rider applies force, appropriate for operating bicycle 10, along a path extending from a region proximate the seat 18 towards the area of the pedals 22, 24. Since this invention provides the pedals 22, 24 at a position along a forwardmost region of the frame 16, such force follows a diagonal line down towards the vehicle's lower, front end. Thus, the direction of such operational force has a substantial horizontal component. Accordingly, during operation of the vehicle constructed according to the present invention, the rider is postured low, with reduced overall height. Such placement of the rider aids in minimizing drag. This is in sharp contrast to ordinary bicycles typically having foot pedals positioned beneath the seated rider. As noted earlier, such bicycles require a vertically directed operating force which tends to place the rider in an upright, high drag operating position.

The unique design of the present invention provides an arrangement of elements which not only distinguish the bicycle 10 structurally from most commonly known bicycle constructions, but which also minimize the potential for incurring various inconveniences during efforts in transforming the vehicle 10 between its erected operating configuration and its compactly folded configuration.

It is quite likely that certain important structural features of the present invention, as well as various advantages, are already apparent by way of the discussions and descriptions set forth above. Such features and advantages should become even clearer, and further advantages of the present invention should be easily recognized and understood, upon studying the additional detailed description materials and reading the various accompanying comments which are set forth below.

The frame 16, as illustrated in the embodiment of FIG. 1, is comprised of a plurality of separate and distinct frame sub-components, or sections. Particularly, the frame 16 (as shown) includes a front section 26 located towards the forward end of vehicle 10, a rear section 28 located towards the rearward, or tail, end of vehicle 10, and an intermediate mid-section 30 disposed along a middle region of the vehicle 10 and spanning the distance of space which separates the front and rear sections (26 and 28). Upon properly aligning the sections in series (i.e., front-middle-rear) and appropriately connecting them together, as described more fully below, the sections (26, 28 & 30) are made to perform just as a single, unitary frame.

The distinct sections (26, 28 & 30) of frame 16, are each uniquely adapted to act as means for supporting particular vehicle-related components. Still further, each section (26, 28 & 30) is purposely configured to accomplish and/or allow desirable results and objectives, a number of which are not usually associated with vehicle frames. The structure of FIG. 1 exemplifies plural frame sections (26, 28 & 30) which express such considerations, by design, in construction, and through particular structural arrangement.

As depicted in FIG. 1, the front section 26 of frame 16 acts to support the foot pedals 22, 24, and associated structures. As also shown, each individual pedal 22, 24 is connected at one end of a respective crank arm 33 and 35 (right-side and left-side, respectively). The connections are desirably of a type permitting pedal rotation. Preferably, the pedal connections are made by inserting a short pivot rod, extending from each pedal (22, 24), into a respective receiving socket formed in each crank arm's outer end region. The other end of each crank arm 33, 35, in turn, is attached for sweeping angular motion about a respective axis 36.

In a preferred embodiment, the crank arms are attached at the frame connection points 36 (only one of which is visible in the side view of FIG. 1) in such a way that each pedal and crank arm combination can swing, in a back-and-forth fashion, about its respective axis 36. The axis. 36 for each crank arm, according to the preferred embodiment of FIG. 1, is located proximate the vehicle's forwardmost region and traverses laterally through the side surfaces of the front frame section 26. Additional details concerning pedal operation, and related features, are set out later in the description.

The front section 26 additionally accommodates and provides support for certain other components, which include: a preferred gear system which forms a part of the vehicle drive system; connection means pertaining to the vehicle steering column arrangement 34; and additional connection means pertaining to an interconnection at the region whereat the forward frame section 26 meets with the middle frame section 30. Additional details of the gear system and various connection means, just mentioned, are discussed below.

The mid-section 30 of frame 16 is connected to the front section 26 at an upper point 40 and at a lower point 42. Connection points 40, 42 are disposed along a region at which these two frame sections 26, 30 come together. Although any suitable connection device can be employed, the present invention contemplates that one of the points 40, 42 should desirably utilize a pivotable connection means for allowing rotation of one frame section relative to the other. The axis for such rotation is desirably located at connection point 40. Placement of the rotational pivot axis at connection point 40 offers a very efficient construction for achieving a compact configuration during periods wherein bicycle 10 is folded. By such placement, substantial overlap between the frame sections (26, 30) can be obtained when one frame section is folded around to the other frame section. If rotational point 40, as described, is believed to be a potential source for structural problems in the frame 16, it may be desirable to construct the area as wide as reasonably possible for enhanced frame strength. The structural features and arrangements, as just described, help in providing a construction able to achieve the minimal vehicle folded dimension.

Seat 18 is supported by a section of frame 16, as shown in the embodiment of FIG. 1. While the seat 18 is preferably attached along the top side of mid-section 30 (as shown), it is nevertheless contemplated herein that it might be desirable in some circumstances to attach the seat 18 atop the rear frame section 28 instead. Any known connector arrangements, as considered suitable by those skilled in the art, may be utilized in effecting attachment of the seat 18 along frame 16. A typical arrangement, contemplated herein, utilizes a rod having one end secured to the seat and the other end held within a receiving socket at the vehicle frame. Such connection means could also provide an arrangement of receptacles useful to facilitate adjustments to seat height between various preset positions.

The rear frame section 28 includes suitable structural supports along the rearward vehicle area and accommodates the rear wheel 12. Particularly, rear section 28 provides mounting structure adapted to support the rear wheel 12. In this regard, the rear wheel 12 is mounted to spin freely about its central axle 13. By such mounting arrangement, rear wheel 12 is permitted to readily follow front (powered) wheel 14 during travel.

Rear section 28 is further adapted to be rotated in a fashion to achieve optimal compactness once the bicycle 10 is folded. Such rotation preferably takes place about vertically disposed axii capable of permitting the rear section 28 to swing laterally outward and around. In the preferred embodiment of FIG. 1, a single full length sweep (i.e., beginning at one extreme end and continuing until the other extreme end is reached) by the rear section 28 angularly rotates about one hundred eighty degrees. In this way, the rear section 28 can swing over a sufficient angular distance to reach a preferred final position, adjacent to the mid-section 30 and substantially parallel to the general vertical plane of mid-section 30. This preferred construction further helps to ensure that the minimal vehicle folded dimension is achieved.

Figures 2A, 2B, 3A, 3B:
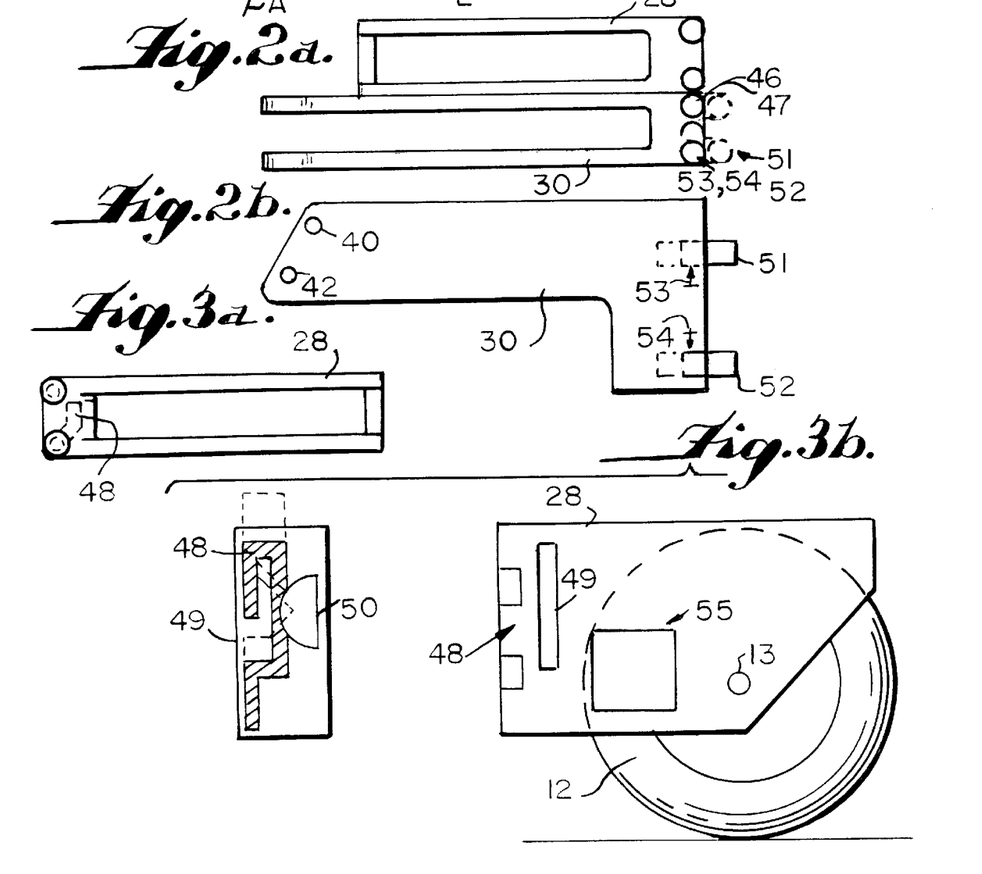
FIGS. 2(A) and 2(B) are top and side views, respectively, showing various features along middle and rearward regions of the vehicle frame structure according to the teachings of the present invention.
FIGS. 3(A) and 3(B) are top and side views, respectively, showing various features along the rear regions of the vehicle frame structure according to the teachings of the present invention.

With additional reference to FIGS. 2 and 3, preferred details for the mid-section 30 and rear section 28 constructions of the invention are shown. One side of the means connecting the mid-section 30 to the rear section 28 includes two double hinged joints 46, 47. The other side contains a sliding element 48. The sliding element 48 is adapted to be activated by an elongated lever 49 which can be rotated about axis 50. The lever 49 is usually locked at its lower position, except during vehicle folding or unfolding. Teeth are provided on sliding element 48 and on lever 49 to achieve a secured lever position. The sliding element is operable to engage hinges 51, 52 which are rotatable about axis 53, 54 at the rear of the frame mid-section 30. The rear section 28 is preferably formed with a cutaway area 55. The details and function of the cut-away area 55 will become clear later in this description.

It is contemplated that steel, aluminum or fiber reinforced plastic resins can be used to construct frame 16. Of course, any other materials, as considered suitable by those skilled in the art, may be used in the frame construction.

Non slip bolts, or other suitable means, are provided in order to secure and maintain the vehicle frame sections in the deployed configuration. Also, a suitable folded position latch, at point 65, is provided for securing and maintaining the vehicle in its folded configuration.

A preferred manner for general folding of bicycle 10, to reduce its overall length and height, is carried out in as follows. Initially, any means positionally interlocking the sections with one another are disengaged from the secured state. To effect the first fold, the frame rear section 28 is rotated with respect to its associated vertical axii around to the right, thereby permitting the rear section 28 and the mid-section 30 of the frame to ultimately become parallel with one another. The second fold is effected by rotating the front frame section 26 with respect to its associated horizontal axis so that it achieves a substantial overlap relative to frame mid-section 30. It is further desirable to shift the seat 18, foot pedals 22, 24, and handlebars 20 from respective operating positions to stored positions. The folded vehicle 10 can conveniently be hand carried and/or stowed out of the way (e.g., under the seat of a passenger train, bus, van, airplane, or other public transportation means).

Some of the most innovative features, according to the teachings of this invention, are situated along the front of the vehicle 10. Certain of these features are contained by the steering column 34.

Figure 4A:
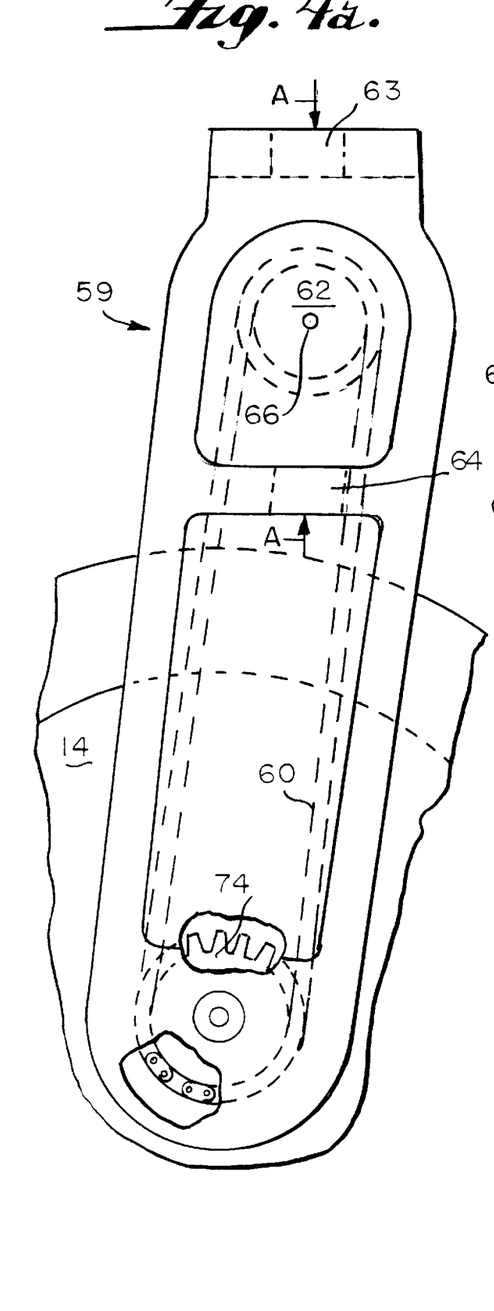
FIGS. 4(A) and 4(B) are side and front views, respectively, of the vehicle front wheel/steering column arrangement according to the teachings of the present invention.
Figure 4B:
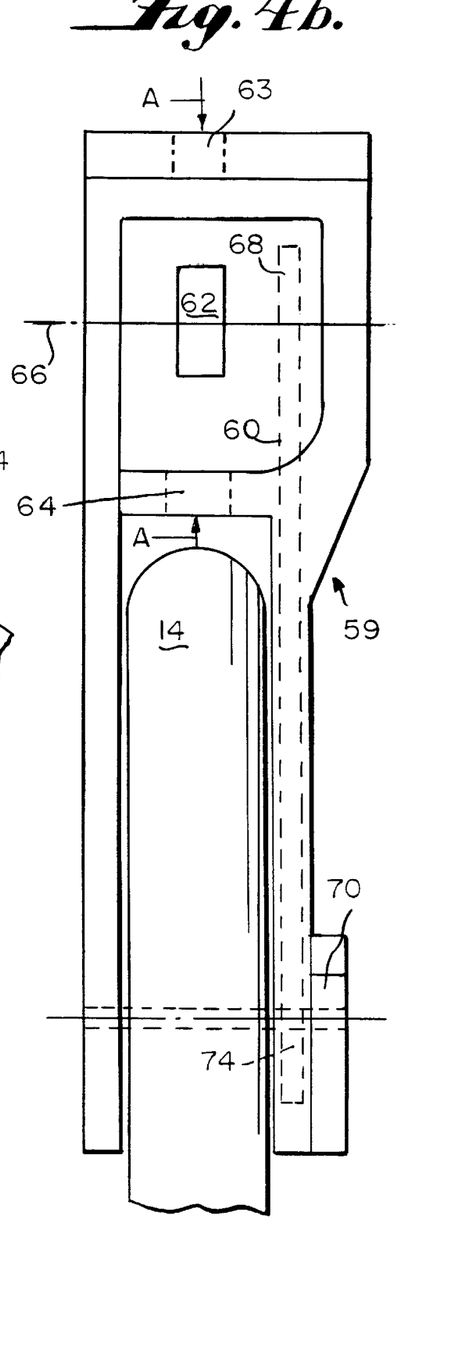

In accordance with the present invention, and with additional reference to FIGS. 4(A) and 4(B), the front steering column 34 consists of the front wheel 14 (including the front tire), a drive chain 60, the handlebars 20, and other control devices, not specifically illustrated, such as braking and gear shifting means. The steering column 34 is connected to the front frame section 26 by way of two (or more) bearings, specifically depicted in FIG. 4 as an upper bearing 63 and a lower bearing 64. The width of the front frame section 26 is sufficiently reduced along the region proximate the steering column 34 in order to adequately accommodate the steering column 34.

The steering column 34 is preferably adapted for folding at its top portion. Particular folding and unfolding action can be modified to satisfy different requirements determined according to the rider's body height, and/or any other special preference(s). Also, one or both hand grips, of handlebars 20, may be constructed to double-function as hand tool to assist vehicle deployment.

The steering column 34 is capable of rotating with respect to the front frame section 26 along an axis of rotation which extends through the center of upper bearing 63 and through the center of lower bearing 64. Such rotational axis is designated by the reference letters A—A in the accompanying drawing figures. The angular rotation is limited to less than 20 degrees. It is not anticipated that a rider should likely encounter significant inconvenience from such limitation.

FIGS. 4(A) and 4(B) show a link structure for the vehicle 10, indicated generally by the reference numeral 59. Link 59 is disposed along the wheel 14 and the bearings 63, 64. Link 59 is constructed and arranged in a fashion to substantially surround the drive system chain 60. The construction and placement of link 59, as described, provides adequate structural strength with minimized width for the folded vehicle.

Link 59 supports gear 62 which is employed to transmit power from the frame 16 to the steering column 34. Gear 62 is adapted to rotate about a central axis along line 66. The drive chain 60 is arranged to operatively engage an upper rotatable chain sprocket 68 and a lower rotatable chain sprocket 74. As shown in FIG. 4(B), the axis of rotation for the upper chain sprocket 68 extends along the same line of rotation as that of gear 62. As contemplated herein, a rachet arrangement is disposed at the sprocket 74 and wheel 14 so that incidental rotation of the front tire will not cause undesirable driving of the chain 60. Any known arrangement, as may be considered suitable by those skilled in the art, for achieving this purpose can be used.

The drive chain 60 and associated support structure is placed towards the right hand side of the vehicle 10. As earlier described, the rear frame section 28 is arranged to fold towards the right hand side and, also, has cut-away area 55. Cut-away area 55 is constructed for accommodating support structure of the drive gear upon folding. Upon folding, the structural support along the right hand side of the steering column, extending towards the right, is received within cut-away area 55. Thus, folding action is not impeded and the width of the folded vehicle is minimized.

An extension 70 around the lower sprocket 74 provides increased strength for the steering column 34 without interfering with folding action or causing increased width of the folded vehicle. The relatively small front wheel 14 used with the vehicle of the invention reduces the need to place foot pedals 22, 24 a great distance away from the vehicle center line. Brakes and controlling cables are suitably installed in the steering column 34.

Commonly, the known bicycle arrangements have foot pedals positioned beneath the rider. Some known bicycle arrangements have foot pedals positioned substantially in front of the rider. Forwardly positioned pedals are preferred herein since they permit placement of the rider in a relatively low position with reduced overall height.

The foot pedals 22, 24, shown in FIG. 1, are adapted to revolve about an axis located forwardly of the steering column 34. Reciprocating action pedals, which sweep back-and-forth, are preferred herein over the well known conventional rotary pedals, since they reduce the necessity of lifting the feet. Nevertheless, rotary pedals are compatible with the teachings of this invention. The pedals, according to the present invention, are separated from one another a sufficient distance (across the bicycle longitudinal centerline) to permit unimpeded rotation of the front wheel.

Figure 5A:
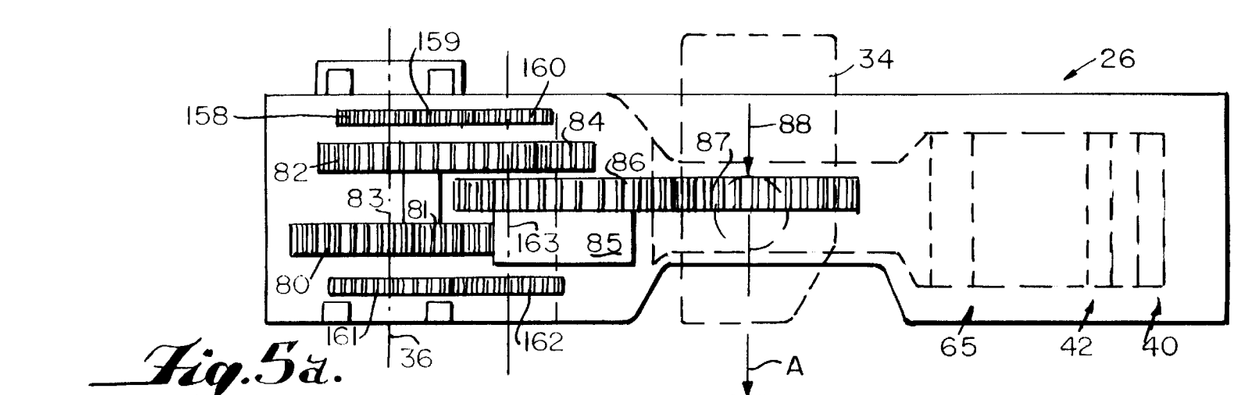
FIGS. 5(A) and 5(B) are top and side views, respectively, showing features along a forward region of the vehicle frame structure according to the teachings of the present invention.
Figure 5B:
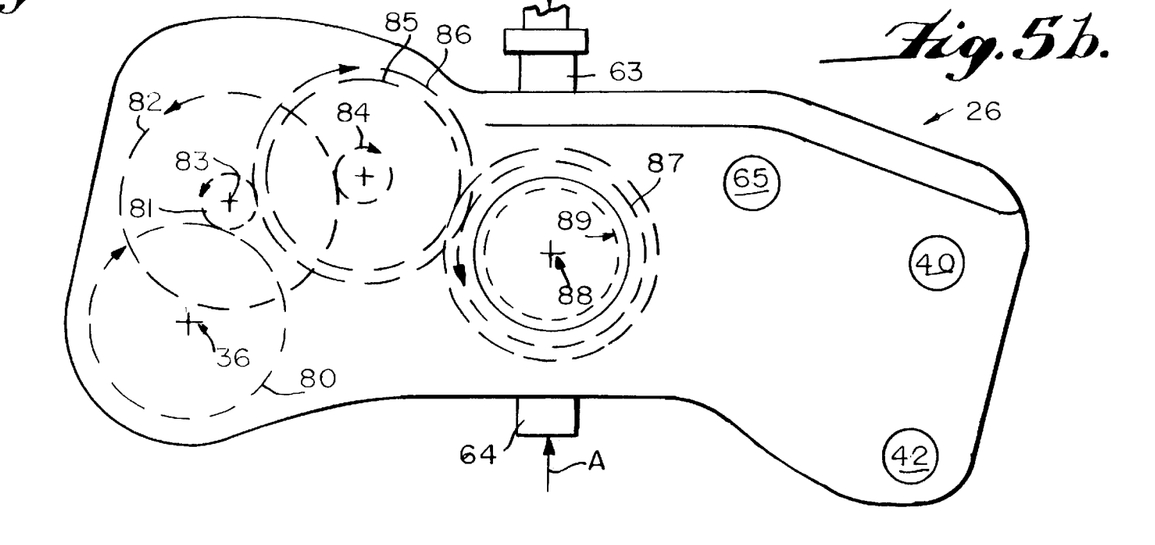

As mentioned earlier, the frame's front section 26 accommodates and provides support for various elements of the power drive system. In this regard, FIGS. 5(A) and 5(B) illustrate structural details of the invention which enable human power to be transmitted to the front wheel 14.

Human (foot) power is applied to the pedals 22, 24 and cause the respective crank arms 33, 35 to rotate about the axis 36, fixed with respect to the front frame section 26. Crank arms 33, 35 are disposed in mechanical communication with gear 80 for inducing rotation of gear 80 responsive to crank action. In accordance with a preferred embodiment of the invention, the power stroke takes place in the clockwise direction. In order to make the rotation of gear 80 follow the direction of the power stroke, a suitable one way rachet arrangement for permitting only clockwise movement of gear 80 is employed. The rachet arrangement utilized should allow each foot pedal to become engaged with the drive mechanism only when the pedal is being pushed forward. During the return stroke, the pedal should be free to slip with respect to the drive gear. By way of such arrangement, human power can be transmitted to the front wheel 14 with the foot pedals 22, 24 moving back and forth along circular arc segments. Any known rachet arrangement, as considered suitable by those skilled in the art, for accomplishing this objective may be employed with the present invention.

Gear 80 of the drive system is disposed in mechanical communication with gear 81 for inducing rotation of gear 81 responsive to action of gear 80. Gear 80 and gear 81 are operatively arranged so that rotation of gear 81 takes place in the counter clockwise direction. Gear 80 is dimensioned larger than gear 81 (radius), so gear 81 exhibits an increase in rotation rate (higher rpm).

Gear 81, in turn, is disposed in rigid mechanical communication with gear 82 for inducing rotation of gear 82 responsive to action of gear 81. Both gear 81 and gear 82 are operatively arranged to rotate about axis 83. Gear 82 is dimensioned larger than gear 81 (radius), so gear 82 exhibits an increased peripheral speed.

Gear 82, in turn, is disposed in mechanical communication with gear 84, which is part of a variable speed (gear ratio) control device 85 (described below), and is operative to induce rotation of gear 86 in the clockwise direction and at the selected rate.

Gear 86, in turn, is disposed in mechanical communication with gear 87 and is operative to induce rotation of gear 87 in the counter clockwise direction. Gear 87 rotates about axis 88, using a large diameter hollow center bearing 90 (FIG. 7(D)) attached to the front frame 26. Gear 89 is located inside of gear 87. Gear 89 is operatively disposed to transmit the counter clockwise rotation from gear 87 to gear 62 (FIG. 4).

As described above, gear 62 is fixed with respect to the steering column 34 in order to rotate in harmony with steering column 34 rotation. Gear 62, therefore, is arranged to make variable angle contact with gear 89 according to the steering need. The diameters of the gears are chosen such that the optimum vehicle speed is achieved with the optimum pedal rate.

Figures 6B, 6C, 6D, 7A, 7B, 7C, 7D:
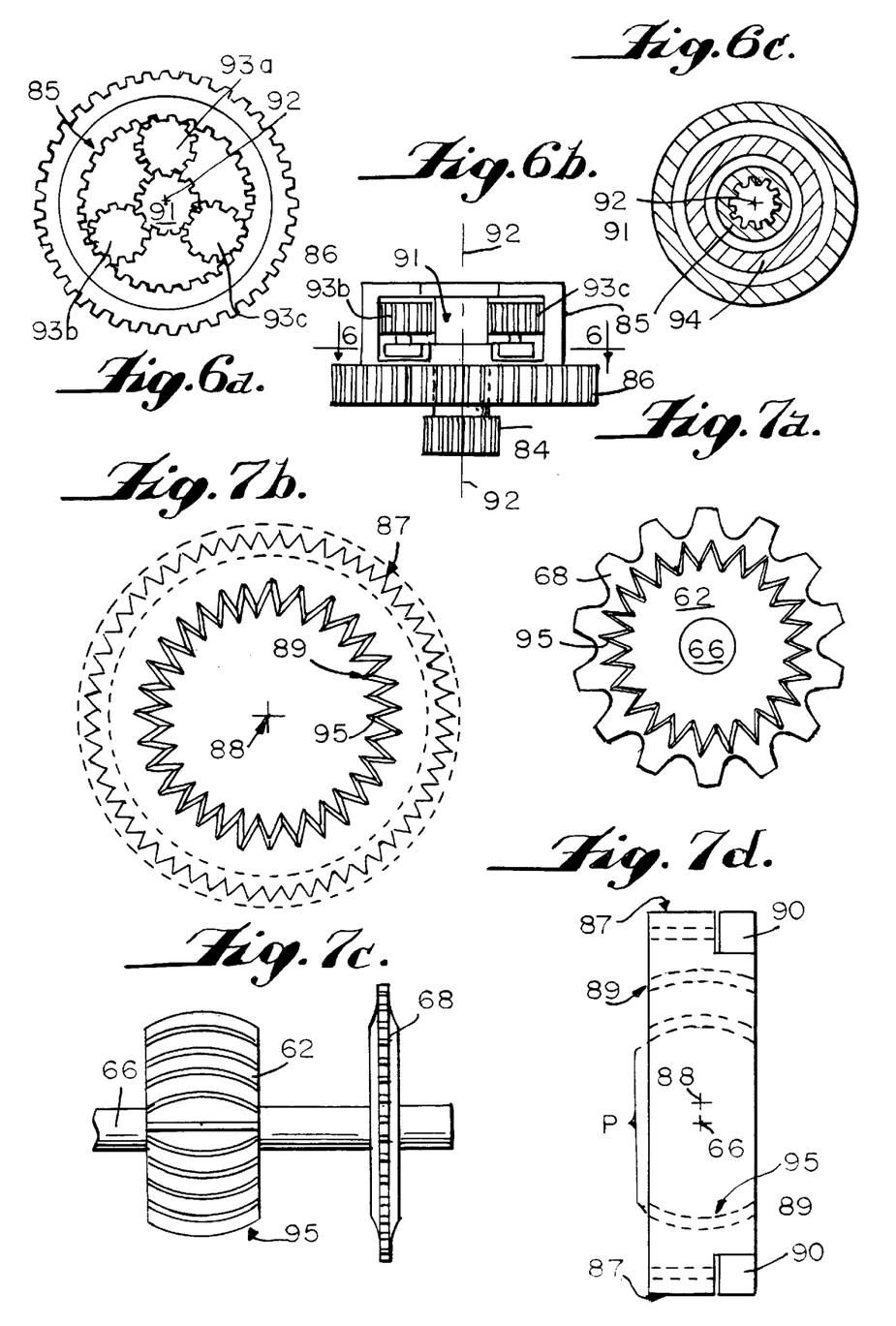

With regard to the variable speed (gear ratio) device 85, mentioned above, FIGS. 6(A)–(C) illustrate certain details of a preferred construction which is considered suitable for use with the invention. FIG. 6(A) is a side view of the variable speed (gear ratio) device 85. FIG. 6(B) is a top view of the variable speed (gear ratio) device 85. FIG. 6(C) is a cross sectional view taken along the line 6—6 of FIG. 6(B). As contemplated herein, the device 85 can have two or more speeds with the maximum to minimum speed ratio of up to 5. Referring generally to the figures, a planetary gear arrangement having plural planetary gears 93 (a, b and c) is provided. The planetary gears 93 (a, b, and c) are disposed upon a sliding disc 94. An element (gear 91) is provided centrally of the arrangement, along rotational axis 92. In operation, making gear 91 slide along the rotational axis 92 enables it to operatively engage the different planetary gears 93 (a, b, or c) or the gears on the device body 85 directly. In this way, different gear ratios can be achieved. This type of speed change device has been used previously for bicycles.

The transmission of (human) pedal power along the vehicle frame to gears 87, 89, discussed earlier, is relatively straight forward (Note: it may be desirable to utilize helical teeth, rather than spur gears, to help make this transmission smooth). Similarly, the transmission of power along the steering column from gear 62 to the front wheel 14, set forth above, is also relatively straight forward. Recall that upon steering the vehicle 10, movement takes place between the frame 16 and steering column 34 about a small angle of rotation. It should be appreciated that the gears employed to transmit the power from the vehicle frame 16 to the steering column 34 during such rotation are extremely important.

In this regard, FIGS. 7(A)–(D) illustrate details of a preferred construction, according to the teachings of the present invention, employed to transmit human power from a gear fixed with respect to the vehicle frame to a gear fixed with respect to the front steering column. FIGS. 7(A)–(B) are side views, and FIGS. 7(C)–(D) are top views. The reference letter "P" designates the position of the inside gear (89) in FIG. 7(D). Gear 89 is constructed to be slightly larger than gear 62 (with commensurate diameter ratio of 5 to 4). Rotational axis 66 of gear 62 is therefore closer to the main contact position 95 than rotational axis 88 of gear 89. Rotational axis 66 also intercepts the steering column rotational axis A—A. The surfaces of the teeth on gear 62 are surfaces of rotation with respect to the steering axis when the teeth are disposed at contact position 95. The surfaces of the teeth on gear 89 are whatever is necessary to allow the teeth of gear 62 to operate.

The surfaces of the teeth on gear 89 can be made using a grinding tool shaped like the tooth configuration upon gear 62. The drawings of FIG. 7 are not intended to be precise representations of the gears. The space between the teeth in gears 89 and 62 may likely be somewhat greater than that depicted in the figures. The construction as described herein allows enough room to accommodate the bearings 63, 64 and the frame structure. There should be room to make all gears to be more than 0.5 inches wide. Such widths can be smaller if the material strength is adequate.

Front wheel drive (power) might be achievable for the vehicle of this invention without requiring the gears described in connection with the drawings of FIG. 7 (or other means accomplishing such purpose) if steering were transferred to the back wheel. However, it would likely prove very difficult for a rider to maintain adequate control with a rear-wheel steering vehicle. Also, placement of steering components along the rear wheel would cause complications in vehicle folding and/or unfolding. Thus, the front wheel steering described herein is preferred.

Next, referring again to FIG. 1 and FIGS. 5(A)–(B), a construction suitable to ensure the desired reciprocating action upon powering pedals 22, 24 is described. As mentioned earlier, upon pushing one foot pedal forward, the other pedal should retract. Such reciprocating pedal actions should take place together. To accomplish this objective, a system of gears, and/or segments of gears, can be employed. The preferred gear system of the invention is depicted in FIGS. 5(A)–(B).

Specifically, gears 158 and 161 are rigidly attached to respective crank arm portions 33, 35 in a manner to cause each gear to rotate therewith. Upon pushing pedal 22 forward, the resulting crank arm 33 motion induces gear 158 to rotate in the clockwise direction. Gear 158 is disposed in mechanical communication with gear 159 for inducing rotation of gear 159 responsive to action of gear 158. Gear 158 and gear 159 are operatively arranged so that rotation of gear 159 takes place in the counter clockwise direction. Gear 159, in turn, is disposed in mechanical communication with gear 160 for inducing rotation of gear 160 responsive to action of gear 159. Gear 159 and gear 160 are operatively arranged so that rotation of gear 160 takes place in the clockwise direction. Gear 160, in turn, is disposed in mechanical communication with gear 162 through an elongated shaft member 163, and operates to induce clockwise rotation of gear 162. Gear 162, in turn, is disposed in mechanical communication with gear 161 for inducing rotation of gear 161 in response to rotation of gear 162. Gear 162 and gear 161 are operatively arranged so that clockwise rotation of gear 162 operates to rotate gear 161, and the rigidly attached crank arm 35, in the counterclockwise direction. Thus, by the described construction, the goal of counter rotating pedals is achieved.

If the number of teeth for gears 158, 161 and 160, 162 are designed as two matched pairs, the angle of rotation for the right and left side will be perfectly matched. As should be readily apparent to those skilled in the art, gear 159 obviously needs to have the same pitch as gears 158 and 160.

The gears for use with the invention are preferably made of high strength material, such as steel. Any other material, as considered suitable by those skilled in the art, can be used in the gear constructions.

Figure 8A:
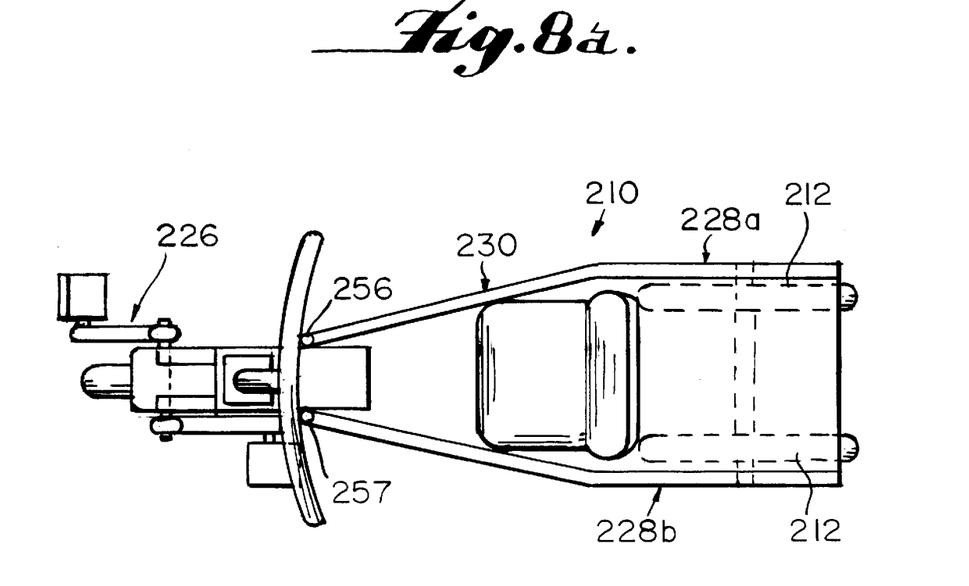
FIGS. 8(A) and 8(B) are top and side views, respectively, of a three-wheeled human powered ground vehicle in a fully erected operating configuration according to the teachings of another preferred embodiment of the present invention.
Figure 8B:
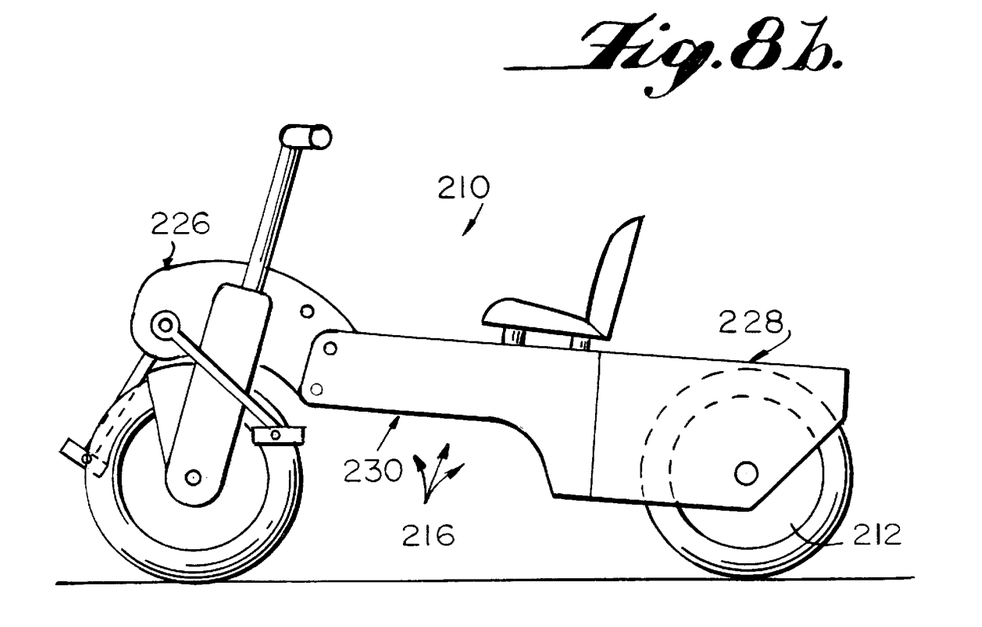

FIGS. 8(A) and 8(B) are top and side views, respectively, of a three-wheeled human powered ground vehicle 210 in a fully erected operating configuration according to the teachings of another preferred embodiment of the present invention. As with the embodiment of FIG. 1, the three-wheeled vehicle of the invention can be folded to reduce the overall length and height. Except where noted, the construction and operation of the embodiment illustrated in the drawings of FIG. 8 can be assumed to be like those described above regarding the two-wheel embodiment. The mid-section 230 of frame 216 is hinged at 256, 257 to spread out to form a triangular structure. Two rear-section portions 228 (a and b) are deployed side by side and are separated by a distance of at least twelve inches. The vehicle 210, as shown, employs a smaller back wheel 212 than the rear wheel 12 (FIG. 1) of the two-wheeled preferred embodiment. The smaller rear wheel construction 212 permits desirable strength enhancement structures to be disposed along the rear frame section 228 (e.g., for the hinged parts), without extending outside the basic length and width boundaries defined by the frame front section 226 and frame mid-section 230. The resulting increased stability, at the expense of reduced speed, may be desirable for some applications.

Figure 9:
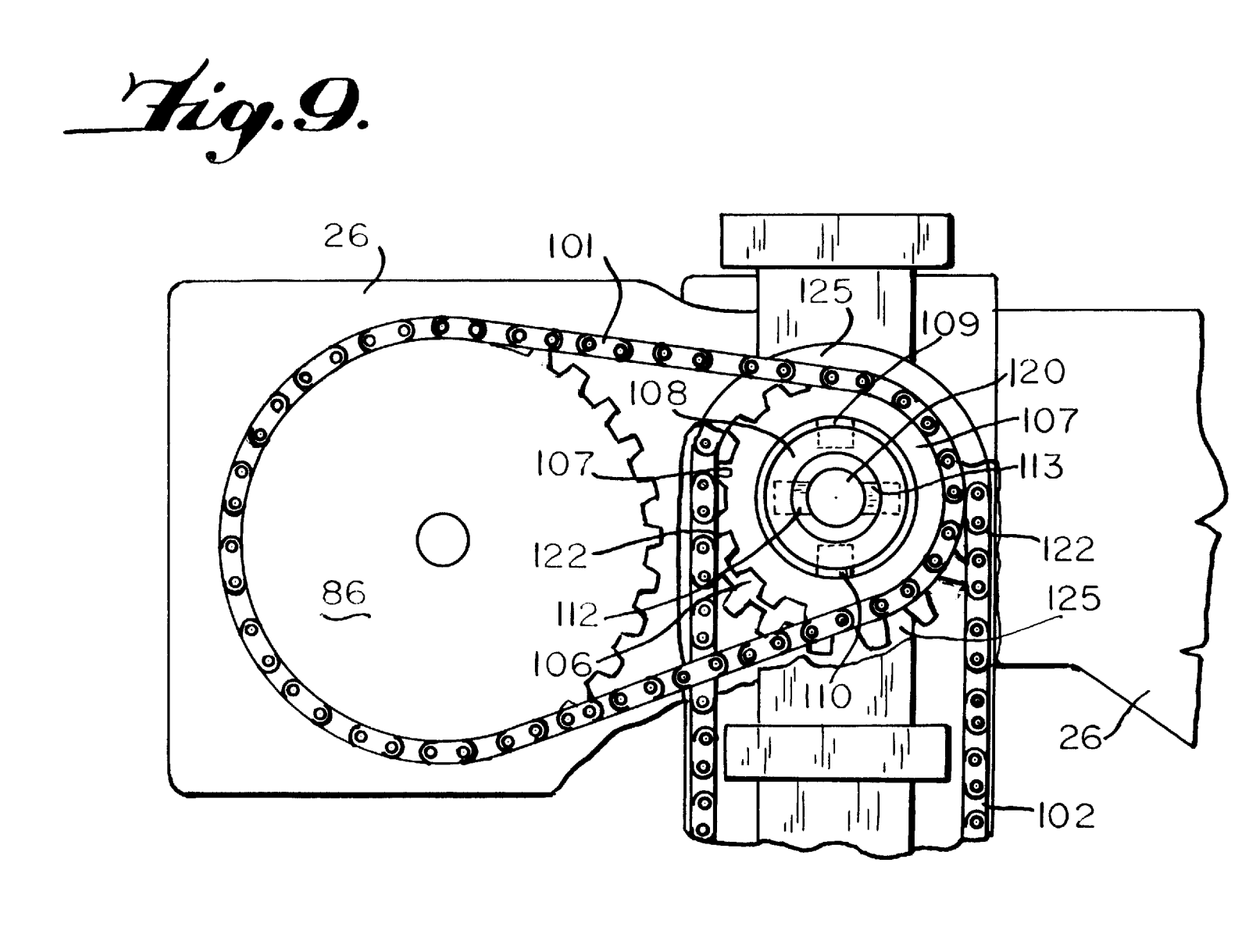
FIG. 9 is a side view shown in partial cutaway of an alternative intermediate power transmitting assembly according to another embodiment of the present invention.
Figure 10:
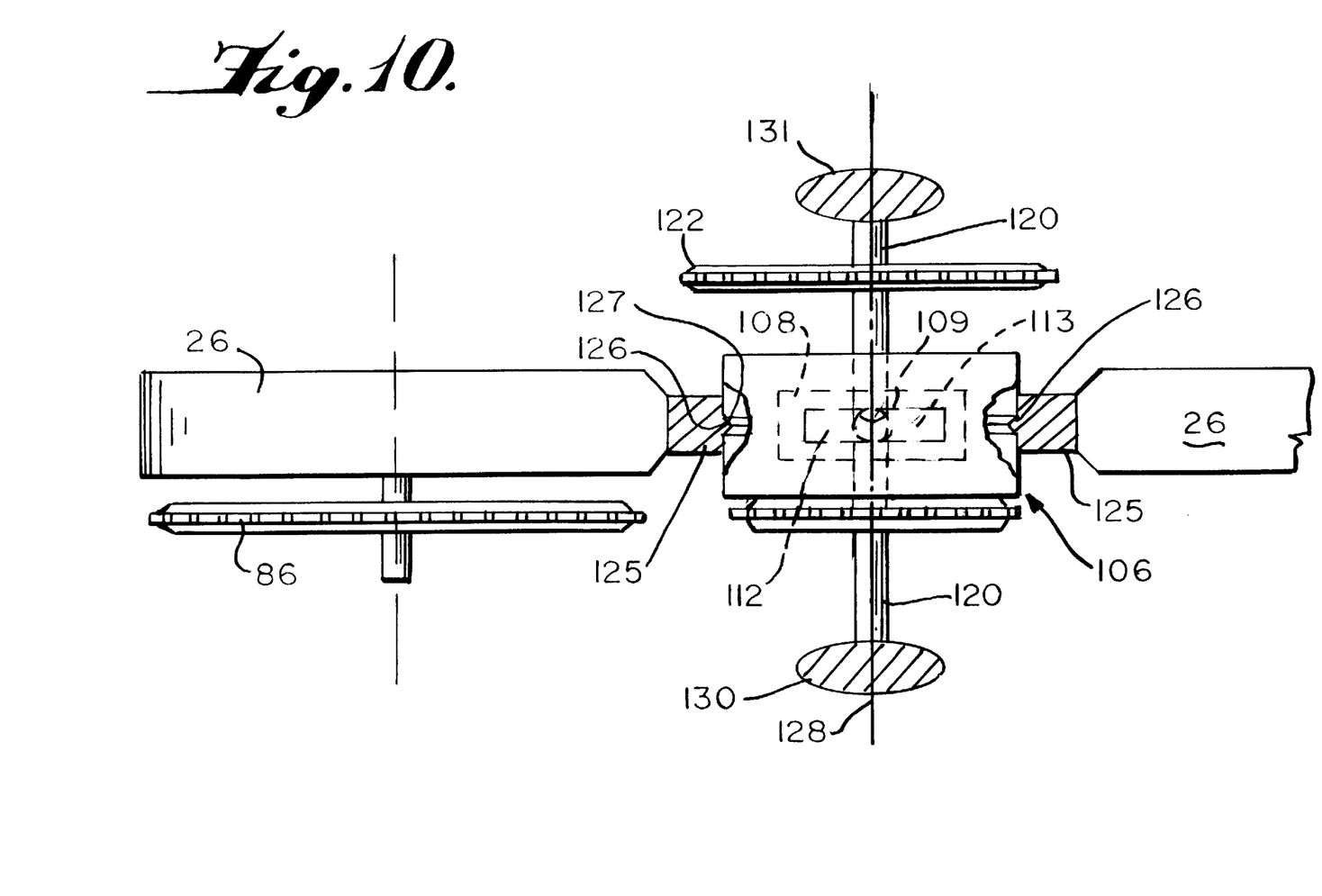
FIG. 10 is a top view in partial phantom of the intermediate power transmitting assembly shown in FIG. 9 with chains removed for the sake of simplicity.
Figure 11:
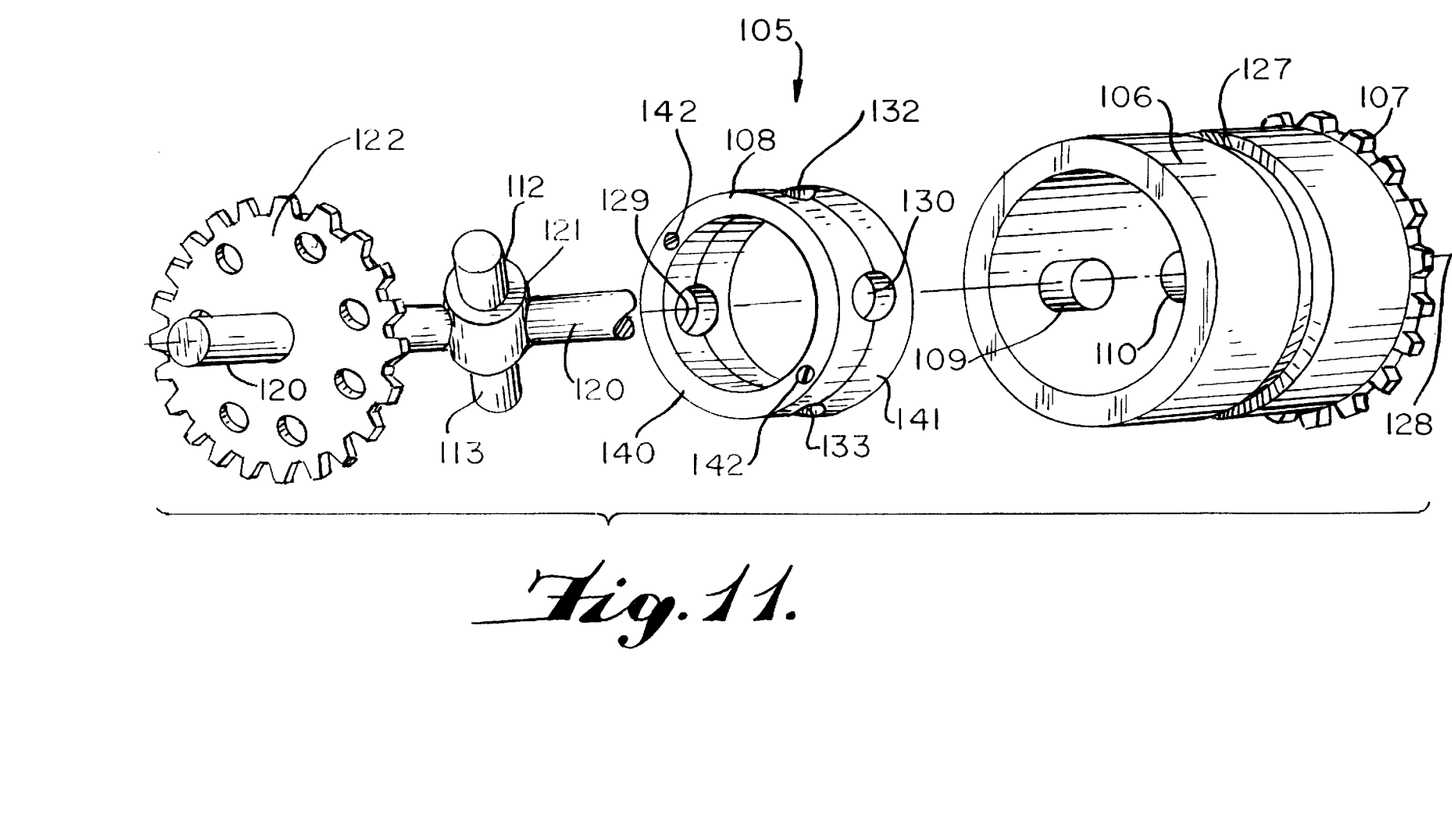
FIG. 11 is an exploded view of the universal joint connection used in the intermediate power transmitting assembly shown in FIGS. 9 and 10.

According to an alternative embodiment of the present invention, the intermediate power transmitting assembly comprises a universal joint connection as shown in FIGS. 9–11. According to the embodiment of FIGS. 9–11, the intermediate power transmitting assembly comprises a first gear 106 communicating with a second gear 122 via a universal joint connection which includes a ring member 108. First gear 106 communicates with and is powered by gear 86 of the motive power input assembly (FIGS. 5*a* and 5*b*), by means of chain 101. Second gear 122 communicates with and powers rotatable chain sprocket 74 of the front wheel (FIG. 4*a*) by means of chain 102. The universal joint connection shown in FIGS. 9–11 may replace the gear arrangement shown in FIGS. 7*a*–7*d* or may be directly, or otherwise indirectly, connected to foot pedals for providing a power input.

As is best seen in FIGS. 9 and 10, gear 106 is fixedly positioned for rotation in front frame portion 26. A large bore bearing 125 mounted to frame 26 captures gear 106 and prevents movement of the gear, except rotational movement, relative to the frame. The large bore bearing permits rotational movement of gear 106 about axis of rotation 128. An inner annular protrusion 126 of the bearing 125 seats in a corresponding groove or recess 127 formed in the outer surface of gear 106 and prevents lateral and longitudinal movement of gear 106 relative to the vehicle frame. Bearing 125 can be mounted to frame portion 26 by any of a variety of ways, for example, by screws, adhesives, frictional fit or confining brackets.

Gear 106 has a toothed portion 107 which accommodates chain 101 and enables transmission of power from gear 86 to gear 106. Gear 106 is tubular in shape having a hollow central portion which accommodates a ring member 108 as part of a universal joint connection. While other universal joint connections are considered within the realm of the present invention, the connection shown in FIGS. 9–11 is a preferred embodiment of a universal joint to be used according to the present invention.

As is best seen in FIG. 11, a preferred universal joint connection used in the present invention includes gear 106, ring member 108, and gear 122 which rotates on axle 120. When a rider is powering the vehicle in a straight forward direction, axle 120 of gear 122 rotates about axis of rotation 128 along with gear 106, and gear 122 rotates in a plane which lies parallel to the plane of rotation of the front wheel. Thus, no torsional stress is induced on chain 102 as it transmits power from gear 122 to sprocket 74 of the front wheel. During turning movements of the vehicle, axle 120 rotates about an axis of rotation which is skewed relative to axis of rotation 128, but gear 122 continues to rotate in a plane parallel to the plane of rotation of the front wheel and again no torsional stress is induced on chain 102.

FIG. 10 shows the front forks 130 and 131, or rigid arms, of the vehicle which are rigidly attached to the front wheel axle (not shown) in a manner which permits rotation of the front wheel on the axle. As can be seen, axle 120 of gear 122 is rigidly attached to forks 130 and 131 on opposite sides of gear 122 in a manner which permits rotation of axle 120. As the steering column 34 rotates about its axis of rotation A—A (FIG. 1), the front forks 130 and 131 also rotate about axis A—A due to their rigid connection to the steering column. Likewise, axle 120 and gear 122 also rotate about axis A—A upon rotation of steering column 34 due to the connections between forks 130, 131 and axle 120, and between axle 120 and gear 122.

The universal joint connection acts as follows. Gear 106 (FIG. 11) has two internally protruding bearings 109, 110 formed integrally therewith or otherwise mounted on the internal annular surface of the gear. The bearings can also be introduced through holes extending from the outer surface of gear 106 to the inner surface thereof and held in place by welding, friction fit, adhesives or by other means. Bearings 109, 110 extend from the inner wall surface of gear 106 into recesses or bores 129, 130, respectively, formed through the outer wall surface of ring member 108. While the embodiment of FIG. 11 shows bores 129 and 130 for receiving bearings 109 and 110, it is to be understood that recesses rather than through-holes may be used to accommodate the bearings.

Gear 122 and its axle 120 may be considered part of an intermediate power transmitting assembly 105 which, in the embodiment shown in FIG. 11, also includes ring member 108 and gear 106. Gear 122 transfers power from the intermediate power transmitting assembly to sprocket 74 of the front wheel by chain 102. Gear 122 is driven by axle 120, which is driven by protrusions or bearings 112, 113, which are driven by ring member 108, which is driven by gear 106. Thus, as mechanical force is supplied to the motive power input assembly, the force is transmitted through intermediate power transmitting assembly 105 to the front wheel.

Gear 122 is rigidly connected to its axle 120 for rotation therewith. Axle 120 is rigidly connected to protrusions or bearing 112, 113 so that as bearings 112 and 113 rotate about the axis of rotation of axle 120, they transfer rotational movement to axle 120, which in turn transfers rotational movement to gear 122. As shown in FIG. 11, axle 120 is provided with an enlarged portion 121 having a cylindrical opening therethrough of large enough diameter to accommodate bearings 112, 113. According to this embodiment, bearings 112 and 113 are both formed from a single cylindrical piece or rod of metal, such as steel. The rod which constitutes bearings 112, 113 has an outer diameter which is just barely smaller than the diameter of the cylindrical opening through portion 121. A snug fit of the rod within the opening is thereby provided. The rod can then be welded within the opening to be secured therein, or otherwise adhered, frictionally fit, or deformed. A set screw could also be used to hold the rod in the opening, so long as a rigid connection of the bearings 112, 113 to the axle 120 results. If a very tight fit of the rod in the opening is provided, then it may not be necessary to weld or otherwise subsequently secure the rod. Alternatively, no enlarged portion of the axle is needed if bearings 112 and 113 are welded directly to axle 120, or formed integral therewith, or otherwise rigidly connected to the axle.

The rotation of bearings 112 and 113 is driven by rotation of ring member 108, which is in turn driven by rotation of gear 106. Bearings 112 and 113 are seated in recesses or bore holes 132, 133, respectively, in ring member 108. Although the embodiment of FIG. 11 shows reference numerals 132 and 133 as through-holes extending completely through the wall of ring member 108, it is to be understood that recesses can be used instead of through-holes to accommodate the bearings.

The relationship between bearings 112, 113 and bore holes 132, 133, respectively, is such that the bearings are confined in the bore holes but are held within the holes loosely enough to permit pivoting movement of the bearings. The bearings 112, 113, and thus axle 120, are permitted to pivot about an axis which is defined as running through the centers of both bearings 112 and 113 and substantially perpendicular to axle 120. Likewise, bearings 109, 110 are confined in bore holes 129, 130, respectively, but are held loosely enough to permit pivoting movement of ring member 108 on the bearings. The ring member 108 is thus permitted to pivot about an axis which is defined as running through the centers of both bearings 109, 110 and through the centers of bore holes 129, 130. The result is a universal joint connection which permits efficient transmission of power from the motive power input assembly to the front wheel even through an angled relationship between the two during turning motions. In a preferred embodiment, bore-holes 129, 130, 132, 133 are much larger than bearings 109, 110, 112, 113, respectively, and sleeve bearings, bushings, needle roller bearings, or other anti-friction devices can be provided between the bearings and boreholes.

In another preferred embodiment, the diameter of axle 120 is greater than the diameters of bearings 112, 113 thus permitting more power in less volume than if the diameter of axle 120 were smaller than the diameters of bearings 112, 113. A larger diameter of axle 120 is also necessary if the bearings 112, 113 are provided as a single rod extending through the axle, as shown in FIG. 11.

For construction of the universal joint connection, one preferred method of assembly involves providing the ring member in more than one piece, for example, in two halves as shown in FIG. 11. FIG. 11 shows ring member 108 comprising two halves 140, 141 which are held together by screws 142. The ring member would not have to be separated into halves if bearings 109, 110 are pressed through the wall of gear 106 and straight into bore holes 129, 130, respectively. However, it is preferred to provide one or more removable sections of the ring member to allow bearings 112, 113 access to bore holes 132, 133, respectively.

If bearings 112, 113 are provided as a single rod which extends through the opening in portion 121, it is possible, e.g., to insert the axle 120 through ring member 108 and then insert the rod through borehole 132, through the opening in axle portion 121, and then through borehole 133, without disassembling the ring member. Bearings 109 and 110 can also be inserted into their respective boreholes without disassembling ring member 108 if bearings 109, 110 are pushed through holes in gear 106. Thus, it is possible to provide ring member 108 as a single piece which requires no assembly or disassembly.

Figure 12:
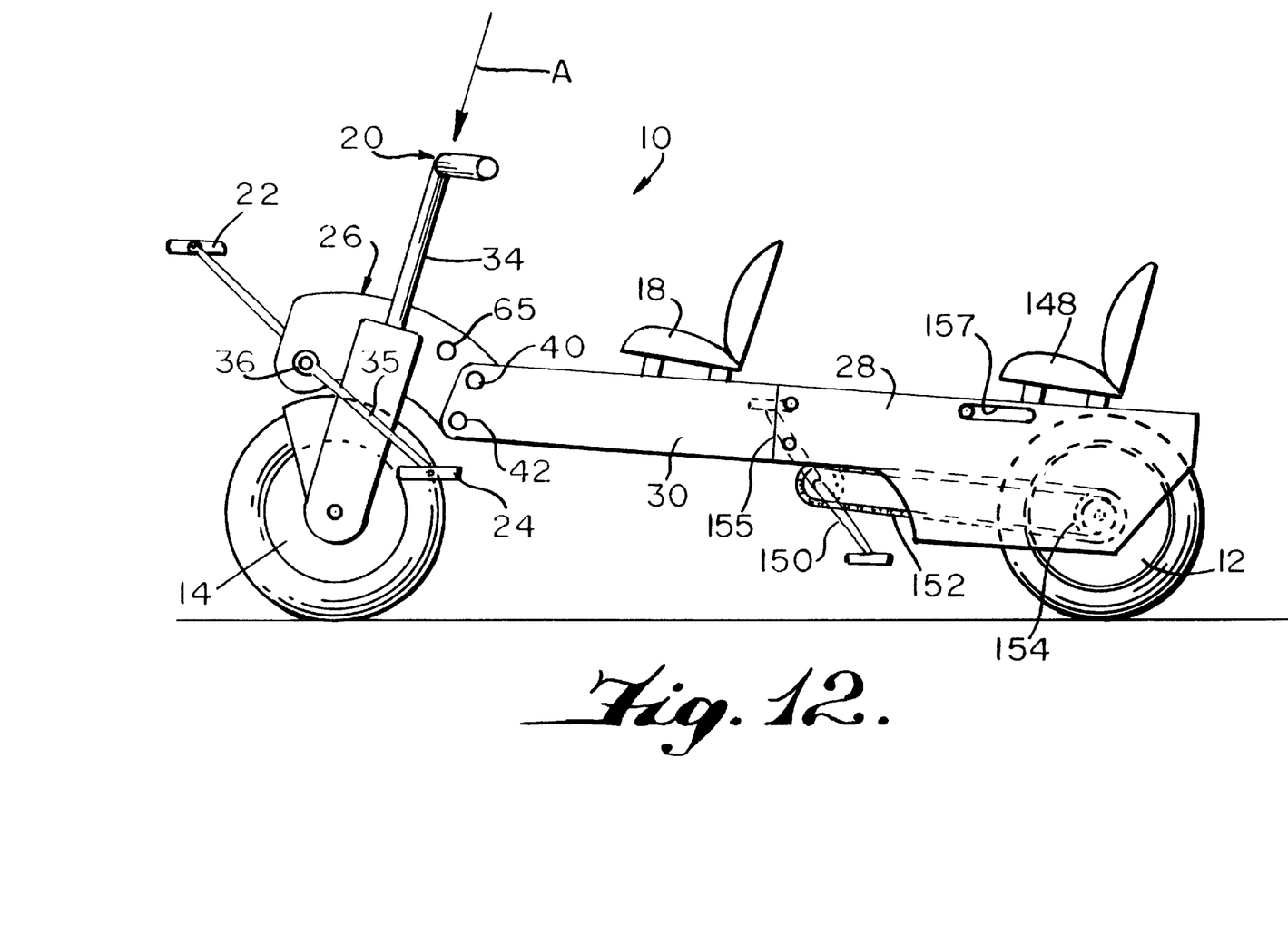
FIG. 12 is a side view of a two-person human powered ground vehicle according to yet another embodiment of the present invention.

FIG. 12 shows another embodiment of the present invention in the form of a two-person human powered ground vehicle. A back seat 148 is provided in addition to front seat 18. The back seat 148 is provided on the rear section 28 of the vehicle frame. The rear rider can power the back wheel by pedaling the set of back pedals 150. The pedals 150 drive a chain 152 which engages and drives sprocket 154 of the back wheel. According to the two-person embodiment, either the intermediate power transmitting assembly of FIGS. 7a–7d can be used to power the front wheel or the assembly of FIGS. 9–11. In the embodiment shown, the assembly of FIGS. 9–11 is employed along with a simple rotating front pedal arrangement, instead of the ratcheting front pedals described above. According to the embodiment shown in FIG. 12, the rear section 28 of the frame 16 is hinged along folding line 155 in a manner similar to that described above with reference to the connection between sections 28 and 30. According to the embodiment shown, the complete rear section 28 can be folded with respect to middle section 30 without disturbing the drive mechanism for the rear wheel. A handle 157 is also provided for the comfort and safety of a back rider, although a handlebar may alternatively be used and connected to the frame 16, to the back of seat 18, or elsewhere on the vehicle.

It should be noted that both the two-wheel and three-wheel embodiments can be constructed utilizing the same front section.

The vehicle frame sections described above could be made by machining aluminum materials (e.g., blocks) to the described configurations. Of course, it is desirable to use a low-cost production technique, appropriate for the chosen materials, in constructing the vehicle of the present invention. Casting, stamping, and stamp bending and/or welding are contemplated as suitable production techniques. Stamping may be appropriate for plastic structural elements utilized in the invention. Any other production technique(s), as contemplated by the skilled artisan, for achieving the invention may be employed.

It is contemplated that selective material removal, for a vehicle constructed according to the present teachings, at positions not essential to structural integrity or vehicle operation, can advantageously reduce vehicle weight. Vehicle weights of less than 20 pounds should be possible.

The vehicle is operated in the deployed configuration, as shown in FIG. 1. As noted earlier, the front wheel drive, front wheel steering construction limits the steering column angle of rotation. Also, the back-and-forth pedal action reduces the required foot movement amplitude. Otherwise, the vehicle functions similar to a normal bicycle. Speeds around 20 mph should be readily achievable by the average rider.

The following steps are contemplated for converting from the vehicle's compactly folded position to its deployed operational configuration:

1. The frame's rear section is rotated with respect to the mid-section, and the lever (lock) is secured;
2. The front segment is rotated with respect to the rest of the frame, and the lock screws are tightened;
3. The top portion of the steering column and the handlebars are unfolded;
4. The foot pedals are attached by inserting the rod ends into receiving sockets in the crank arms; and,
5. The seat is attached and adjusted to the desired preset height.

The reverse process is used to fold the vehicle.

One convenient advantage of the front wheel drive, front wheel steering arrangement of this invention relates to the readily accessible placement of all rider operated controls in proximity with one another. Another convenient characteristic of a vehicle made according to the present invention relates to a minimized need for adjustments once the vehicle is unfolded.

Those skilled in the art can now appreciate from the foregoing description that the broad teachings of the present invention can be implemented in a variety of forms. Therefore, while this invention has been described in connection with particular embodiments and examples thereof, the true scope of the invention should not be so limited. Various changes and modifications may be made without departing from the scope of the invention, as defined by the appended claims.

It is claimed:

1. A human powered ground vehicle comprising: a vehicle frame having a forward end and a rearward end; a steering column hingedly connected to said vehicle frame and extending across said vehicle frame; a motive power input assembly supported by said frame and adapted to derive motive power from a physical exertion of force by a driver, said motive power input assembly including at least one pedal member adapted to revolve about a laterally extending axis which traverses said vehicle frame through an area located forward of said steering column; a plurality of wheels, including a front wheel mounted for rotation proximate said steering column, and at least one rear wheel mounted for rotation proximate said rearward end of said vehicle; and means for transmitting power from said motive power input assembly to said front wheel, thereby permitting said vehicle to be driven, wherein said means for transmitting power includes a gear system rotatably mounted to said vehicle frame for rotation about a central axis that is fixed with respect to said vehicle frame, a chain arrangement including at least one chain drive gear, said chain drive gear being rotatably mounted to said steering column for rotation about a central axis that is fixed with respect to said steering column, and an intermediate power transmitting assembly, wherein said intermediate power transmitting assembly includes a universal joint mechanically and directly connecting said gear system to said chain drive gear, said universal joint comprising a two-way pivoting member, said two-way pivoting member being pivotally connected to said gear system for pivoting movement of said two-way pivoting member about a first universal joint axis of rotation, and said two-way pivoting member being pivotally connected to said chain drive gear for pivoting movement of said chain drive gear about a second universal joint axis of rotation, and wherein said first and second universal joint axes of rotation are substantially perpendicular to one another.

2. A human powered ground vehicle as defined in claim 1, wherein said gear system comprises a first gear member, and said first gear member mechanically communicates with said chain drive gear through said two-way pivoting member.

3. A human powered ground vehicle as defined in claim 2, wherein said first gear member has an opening in a central portion thereof and said two-way pivoting member comprises a ring member connected to said first gear member within said opening for pivoting movement therein.

4. A human powered ground vehicle as defined in claim 3, wherein said ring member has two diametrically opposed bores and said first gear member includes two diametrically opposed bearings which are seated respectively in said bores.

5. A human powered ground vehicle as defined in claim 3, wherein said chain drive gear includes an axle which rotates about said central axis which is fixed with respect to said steering column, said axle includes two opposing extensions which extend substantially perpendicular to the axis of rotation of said axle, said ring member has a central opening, and said extensions are disposed within said central opening of the ring member and connected to said ring member for pivoting movement relative thereto.

6. A human powered ground vehicle as defined in claim 5, wherein said ring member has two diametrically opposed bores and said two extensions are seated respectively in said bores.

7. A human powered ground vehicle as defined in claim 4, wherein said chain drive gear includes an axle which rotates about said central axis which is fixed with respect to said steering column, said axle includes two opposing extensions which extend substantially perpendicular to the axis of rotation of said axle, said ring member has a central opening, said extensions are disposed within said central opening of the ring member and connected to said ring member for pivoting movement relative thereto, said ring member has third and fourth bores diametrically opposed to each other, and said first universal joint axis of rotation extends centrally through said third and fourth bores.

8. A human powered ground vehicle as defined in claim 3, wherein said ring member comprises first and second portions removably attached to one another for facilitating construction of said intermediate power transmitting assembly.

9. A human powered ground vehicle as defined in claim 3, wherein said front wheel rotates within a plane and said chain drive gear rotates in a plane which lies parallel to the plane of rotation of said front wheel.

10. A human powered ground vehicle as defined in claim 1, further comprising a second motive power input assembly and means for transmitting power from said second motive power input assembly to said at least one rear wheel.

11. A human powered ground vehicle as defined in claim 10, wherein said means for transmitting power from said second motive power input assembly to said rear wheel includes a chain system comprising a second chain drive gear, said second chain drive gear being rotatably mounted to said vehicle frame for rotation about a central axis which is fixed with respect to said vehicle frame.

12. A human powered ground vehicle as defined in claim 10, wherein said vehicle frame includes frame sub-sections and pivotable coupling members, said pivotable coupling members interconnecting said frame sub-sections in a fashion allowing angular rotation therebetween and whereby said vehicle frame is manually transformable between a deployed operating configuration and a folded configuration adapted to minimize vehicle dimensions.

13. A human powered ground vehicle comprising: a vehicle frame having a forward end and a rearward end; a steering column hingedly connected to said vehicle frame and extending across said vehicle frame; a motive power input assembly supported by said frame and adapted to derive motive power from a physical exertion of force by a driver, said motive power input assembly including at least one pedal member adapted to revolve about a laterally extending axis which traverses said vehicle frame through an area located forward of said steering column; a plurality of wheels, including a front wheel mounted for rotation proximate said steering column, and at least one rear wheel mounted for rotation proximate said rearward end of said vehicle; and means for transmitting power from said motive power input assembly to said front wheel, thereby permitting said vehicle to be driven, wherein said means for transmitting power includes a gear system, a chain arrangement, and an intermediate power transmitting assembly, said gear system comprising a first gear member rotatably mounted to said vehicle frame for rotation about a central axis that is fixed with respect to said vehicle frame, said first gear member having an opening in a central portion thereof, said chain arrangement comprising at least one drive gear having a second drive member rotatably mounted to said steering column for rotation about a central axis that is fixed with respect to said steering column, and said intermediate power transmitting assembly comprising a universal joint mechanically connecting said first gear member to said second gear member, wherein said universal joint comprises a ring member pivotally connected to said first gear member within said opening.

14. A human powered ground vehicle as defined in claim 13, wherein said ring member has two diametrically opposed bores and said first gear member includes two diametrically opposed bearings which are seated respectively in said bores.

15. A human powered ground vehicle as defined in claim 13, wherein said second gear member includes an axle which rotates about said central axis of rotation which is fixed with respect to the steering column, said axle includes two opposing extensions which extend substantially perpendicular to the axis of rotation of the axle, said ring member has a central opening, and said extensions are disposed within said central opening of the ring member and connected to said ring member for pivoting movement relative thereto.

16. A human powered ground vehicle as defined in 13, wherein said ring member has two diametrically opposed bores and said two extensions are seated respectively in said bores.

17. A human powered ground vehicle as defined in claim 14, wherein said second gear member includes an axle which rotates about said axis of rotation fixed with respect to said steering column, said axle includes two opposing extensions which extend substantially perpendicular to the axis of rotation of said axle, said ring member has a central opening, said extensions are disposed within said central opening of the ring member and connected to said ring member for pivoting movement relative thereto, said ring member has third and fourth bores diametrically opposed to each other, and said first gear member is pivotally connected to said ring member for pivotal movement about an axis of rotation that extends centrally through said third and fourth bores.

18. A human powered ground vehicle as defined in claim 13, wherein said ring member comprises first and second portions removably attached to one another for facilitating construction of said intermediate power transmitting assembly.

19. A human powered ground vehicle as defined in claim 13, wherein said front wheel rotates within a plane and said second gear member rotates in a plane which lies parallel to the plane of rotation of said front wheel.

* * * * *